(12) United States Patent
Choi

(10) Patent No.: US 10,167,792 B2
(45) Date of Patent: *Jan. 1, 2019

(54) ENGINE SYSTEM AND CONTROL METHOD OF USING THE ENGINE SYSTEM

(71) Applicant: HYUNDAI MOTOR COMPANY, Seoul (KR)

(72) Inventor: Choo Saeng Choi, Seongnam-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 83 days.

This patent is subject to a terminal disclaimer.

(21) Appl. No.: 15/374,753

(22) Filed: Dec. 9, 2016

(65) Prior Publication Data

US 2018/0080397 A1   Mar. 22, 2018

(30) Foreign Application Priority Data

Sep. 20, 2016  (KR) ........................ 10-2016-0120286

(51) Int. Cl.
| | |
|---|---|
| *F02D 41/00* | (2006.01) |
| *F02M 35/10* | (2006.01) |
| *F02M 26/21* | (2016.01) |
| *F02M 26/05* | (2016.01) |

(52) U.S. Cl.
CPC ..... *F02D 41/0077* (2013.01); *F02D 41/0007* (2013.01); *F02M 26/05* (2016.02); *F02M 26/21* (2016.02); *F02M 35/10163* (2013.01); *F02M 35/10222* (2013.01)

(58) Field of Classification Search
CPC ............ F02D 41/0077; F02D 41/0007; F02M 35/10222; F02M 26/21; F02M 26/05; F02M 35/10163

USPC .................. 60/600, 605.1, 605.2, 605.3, 611
See application file for complete search history.

(56) References Cited

U.S. PATENT DOCUMENTS

2014/0020664 A1   1/2014   Yoshioka et al.

FOREIGN PATENT DOCUMENTS

| | | |
|---|---|---|
| JP | 2000-303860 A | 10/2000 |
| JP | 2008-215257 A | 9/2008 |
| JP | 2010-059921 | 3/2010 |
| JP | 2012-067609 A | 4/2012 |
| JP | 2014-020246 A | 2/2014 |
| JP | 2015-025414 | 2/2015 |
| JP | 2015-178786 | 10/2015 |

*Primary Examiner* — Hoang Nguyen
(74) *Attorney, Agent, or Firm* — McDermott Will & Emery LLP

(57) ABSTRACT

An engine system includes an intake line, an exhaust line, an exhaust gas recirculation (EGR) system, a turbocharger including a turbine provided in the exhaust line, and a compressor provided in the intake line, wherein the compressor compresses outside air, an intake bypass line which branches off from the intake line at a rear end of the compressor and merges into the intake line at the front end of the compressor, a recirculation valve installed at a point at which the intake bypass line and the intake line merge together, and a controller which controls operations of opening and closing the recirculation valve so that a portion of the intake gas compressed by the compressor is supplied into the intake line at the front end of the compressor through the intake bypass line, or the intake gas is supplied into the combustion chamber through the intake bypass line.

7 Claims, 6 Drawing Sheets

ENGINE SYSTEM AND CONTROL METHOD OF USING THE ENGINE SYSTEM

CROSS-REFERENCE TO RELATED APPLICATION

This application claims the benefit of priority to Korean Patent Application No. 10-2016-0120286, filed with the Korean Intellectual Property Office on Sep. 20, 2016, the entire contents of which are incorporated herein by reference.

TECHNICAL FIELD

The present disclosure relates to an engine system and a control method using the engine system, and more particularly, to an engine system and a control method using the same which are capable of reducing a concentration of exhaust gas remaining in an intake line in an engine equipped with an exhaust gas recirculation system.

BACKGROUND

In general, nitrogen oxide (NOx) included in exhaust gas may cause environmental problems and the irritation of eyes and respiratory organs. NOx is regulated as an air pollutant, and research is being conducted to reduce emissions of the NOx.

An exhaust gas recirculation (EGR) system is a system mounted in a vehicle in order to reduce exhaust gases. In general, NOx increases in a case in which a proportion of air to the gaseous mixture is large, and thus combustion is smoothly carried out. Therefore, the exhaust gas recirculation system is a system that mixes a part (e.g., 5 to 20%) of exhaust gas discharged from the engine with the gaseous mixture again so as to reduce the amount of oxygen in the gaseous mixture and hinder the combustion thereof, thereby reducing a generation of NOx.

As types of exhaust gas recirculation systems, there exist hot exhaust gas recirculation systems (hot EGR system) which reduces particulate materials (PM) and hydrocarbon (HC) as well as NOx by delaying ignition timing and reducing an air-fuel ratio, and cooled exhaust gas recirculation systems (cooled EGR system) which hinders combustion by cooling recirculating exhaust gas and decreasing a temperature in a combustion chamber.

An EGR ratio refers to a ratio of the amount of recirculation gas introduced into the engine through the exhaust gas recirculation system to the overall amount of air (fresh air+recirculation gas) introduced into the engine. When the EGR ratio increases, a concentration of oxygen supplied into the combustion chamber is decreased, such that a combustion temperature is decreased, and the amount of nitrogen oxide is decreased. However, when the amount of recirculating exhaust gas is increased, output of the engine and fuel economy may deteriorate. In contrast, when the EGR ratio decreases, the concentration of oxygen supplied into the combustion chamber is increased, such that a combustion temperature is increased, and the amount of nitrogen oxide is increased. Therefore, the amount of recirculating exhaust gas needs to be appropriately controlled.

In addition, after the engine is turned off, the recirculation gas remains in an intake flow path through which the recirculation gas and the fresh air flow. Further, when the engine is turned on again, the residual gas is introduced into the combustion chamber of the engine, and in this case, there may occur a problem of abnormal combustion such as knocking or pre-ignition in combustion chambers of the engine.

The above information disclosed in this Background section is only for enhancement of understanding of the background of the disclosure and therefore it may contain information that does not form the prior art that is already known in this country to a person of ordinary skill in the art.

SUMMARY

The present disclosure has been made in an effort to provide an engine system and a control method of using the engine system which are capable of reducing a concentration of residual exhaust gas remaining in an intake flow path through which recirculation gas and fresh air flow after an engine is turned off.

The present disclosure has also been made in an effort to provide an engine system and a control method using the same which are capable of preventing the occurrence of abnormal combustion such as knocking or pre-ignition, and accurately controlling an EGR ratio by removing residual gas remaining in an intake line.

Exemplary embodiments of the present disclosure provide an engine system including: an intake line through which fresh air to be supplied into a combustion chamber of an engine flows; an exhaust line through which exhaust gas discharged from the combustion chamber flows; an EGR system which recirculates a part of exhaust gas discharged from the combustion chamber to the combustion chamber; a turbocharger which includes a turbine that is provided in the exhaust line and is rotated by exhaust gas discharged from the combustion chamber, and a compressor that is provided in the intake line and rotated in conjunction with the rotation of the turbine and compresses outside air; an intake bypass line which branches off from the intake line at a rear end of the compressor and merges into the intake line at a front end of the compressor; a recirculation valve which is installed at a point at which the intake bypass line and the intake line merge together; and a controller which controls operations of opening and closing the recirculation valve so that a part of the intake gas compressed by the compressor is supplied into the intake line at the front end of the compressor through the intake bypass line, or the intake gas is supplied into the combustion chamber through the intake bypass line.

The controller may control and open the recirculation valve at a time of tip-out, such that a portion of the intake gas compressed by the compressor of the turbocharger is supplied into the intake line at the front end of the compressor.

The controller may calculate the amount of residual exhaust gas remaining in the intake line between the compressor and the combustion chamber after the engine is turned off, and when the amount of residual exhaust gas is larger than a preset amount, the controller may control and open the recirculation valve when the engine is turned on again.

The controller may calculate the amount of residual exhaust gas based on an EGR ratio and a volume of the intake line.

The recirculation valve may be disposed at an inlet or an outlet of an intercooler disposed in the intake line at the rear end of the compressor.

Some exemplary embodiments of the present disclosure provide a method of controlling an engine, the method including: calculating, by a controller, the amount of residual exhaust gas remaining in an intake line between a compressor of a turbocharger and an intake manifold after an engine is turned off; and controlling, by the controller, based on the amount of the residual exhaust gas, operations of opening and closing a recirculation valve installed in an intake bypass line which branches off from the intake line at a front end of a combustion chamber and merges into the intake line at a front end of the compressor of the turbocharger.

The controlling step may include: determining, by the controller, whether the amount of residual exhaust gas is larger than a preset amount; and opening, by the controller, the recirculation valve when the engine is turned on again, when the amount of residual exhaust gas is larger than the preset amount.

The amount of residual exhaust gas may be calculated based on an EGR ratio and a volume of the intake line.

According to the engine system and the control method using the same according to exemplary embodiments of the present disclosure, it is possible to reduce the concentration of the residual exhaust gas included in the intake gas to be supplied into the combustion chamber by increasing the amount of fresh air, which is to be supplied into the intake manifold through the recirculation valve installed in the intake bypass line that branches off from the intake line at the front end of the combustion chamber and merges into the intake line at the front end of the compressor of the turbocharger.

In addition, it is possible to prevent the occurrence of abnormal combustion in the combustion chamber and to accurately control the EGR ratio by reducing the concentration of residual exhaust gas.

BRIEF DESCRIPTION OF THE DRAWINGS

The drawings are intended to be used as references for describing the exemplary embodiments of the present disclosure, and the accompanying drawings should not be construed as limiting the technical spirit of the present disclosure.

DETAILED DESCRIPTION

Figure 1:
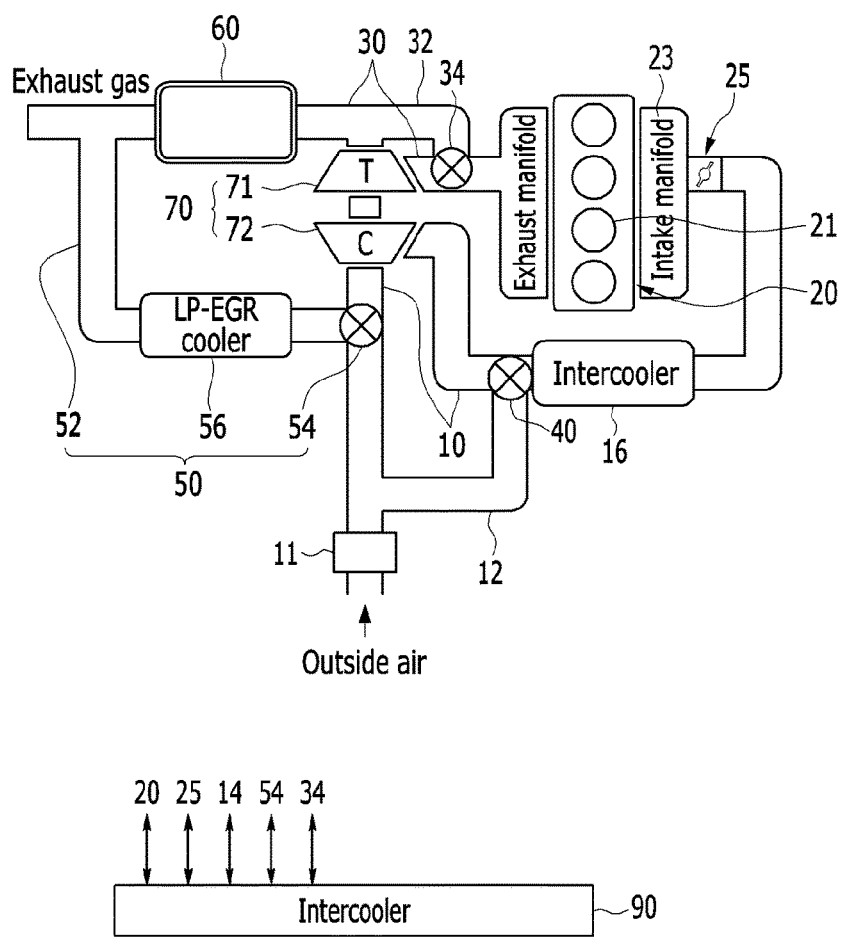
FIG. 1 is a conceptual view illustrating a configuration of an engine system according to exemplary embodiments of the present disclosure.

The present disclosure will be described more fully hereinafter with reference to the accompanying drawings, in which exemplary embodiments of the disclosure are shown. As those skilled in the art would realize, the described embodiments may be modified in various different ways, all without departing from the spirit or scope of the present disclosure.

A part irrelevant to the description will be omitted to clearly describe the present disclosure, and the same or similar constituent elements will be designated by the same reference numerals throughout the specification.

In addition, the size and thickness of each component illustrated in the drawings may be arbitrarily shown for understanding and ease of description, but the present disclosure is not limited thereto. Thicknesses of several portions and regions may be enlarged for clear expressions.

Hereinafter, an engine system according to exemplary embodiments of the present disclosure will be described in detail with reference to the accompanying drawings.

FIG. 1 is a conceptual view illustrating a configuration of an engine system according to exemplary embodiments of the present disclosure.

As illustrated in FIG. 1, the engine system according to exemplary embodiments of the present disclosure includes an engine 20, a turbocharger 70, an EGR system 50, an intercooler 16, a recirculation valve 40 and a controller 90.

The engine 20 includes a plurality of combustion chambers 21 that generates driving power by combusting fuel. The engine 20 is provided with an intake line 10 through which intake gas to be supplied to the combustion chamber 21 flows, and an exhaust line 30 through which exhaust gas discharged from the combustion chamber 21 flows.

An air cleaner, or air filter, 11, which filters fresh air introduced from the outside, is provided in an inlet of the intake line 10.

An intake manifold, which distributes intake gas to be supplied into the plurality of combustion chambers, is provided at a front end of the combustion chambers, and a throttle valve 25, which adjusts the amount of intake gas to be introduced into the intake manifold, is disposed at a front end of the intake manifold.

An exhaust gas purification apparatus 60, which removes various types of hazardous substances included in the exhaust gas discharged from the combustion chamber 21, is provided in the exhaust line 30. To remove nitrogen oxide, the exhaust gas purification apparatus 60 may include a lean NOx trap (LNT), a diesel oxidation catalyst and a diesel particulate filter.

The turbocharger 70 compresses intake gas (outside air+ recirculation gas) which is introduced through the intake line 10, and supplies the intake gas into the combustion chamber 21. The turbocharger 70 includes a turbine 71 which is provided in the exhaust line 30 and rotates due to exhaust gas discharged from the combustion chamber 21, and a compressor 72 which rotates in conjunction with the rotation of the turbine 71 and compresses intake gas.

The EGR system 50 is an apparatus which recirculates a part of the exhaust gas discharged from the combustion chamber 21 to the combustion chamber 21. The EGR system 50 (low pressure exhaust gas recirculation (LP-EGR) apparatus) includes an EGR line 52, an EGR cooler 56 and an EGR valve 54. While the low pressure EGR apparatus is described as an example in exemplary embodiments of the present disclosure, other types of EGR apparatuses (e.g., a high pressure EGR apparatus) may be applied.

The EGR line 52 branches off from the exhaust line 30 at a rear end of the turbine 71, and merges into the intake line 10 at a front end of the compressor 72. The EGR cooler 56 is disposed in the EGR line 52, and cools the exhaust gas that flows through the EGR line 52. The EGR valve 54 is disposed at a point at which the EGR line 52 and the intake line 10 merge together, and adjusts the amount of exhaust gas that flows into the intake line 10 through the EGR line 52. Here, the exhaust gas, which is supplied into the intake line 10 through the EGR line 52, is referred to as recirculation gas.

The intercooler 16 cools intake gas, which is introduced through the intake line 10, through a heat exchange with a coolant. That is, because the intake gas compressed by the turbocharger 70 expands as a temperature thereof increases, an oxygen density of the intake gas supplied into the combustion chamber 21 decreases. Accordingly, it is difficult to output torque required for the engine 20. Therefore, the density of the intake gas is increased by cooling the intake gas by the intercooler 16, thereby improving combustion efficiency of the engine 20.

An intake bypass line 12, which branches off from the intake line 10 at a rear end of the compressor 72 and merges into the intake line 10 at the front end of the compressor 72, is formed. In this case, the intake bypass line 12 may branch off from an inlet or an outlet of the intercooler 16 provided between the compressor and the intake manifold 23, and may merge into the intake line at the front end of the compressor 72.

The recirculation valve 40 is installed at a point where the intake bypass line 12 and the intake line 10 merge together. In particular, the recirculation valve 40 may be provided integrally with the intercooler 16 at the inlet or the outlet of the intercooler 16. The recirculation valve 40 is opened and closed by control signals from the controller 90.

The recirculation valve 40 includes a housing 41, a first passageway 42, a second passageway 43 and a drive unit.

The housing 41 is installed on the intake line 10 provided at an upper side of the intercooler 16, and a flow path is formed in the housing 41.

The first passageway 42 is formed in the housing 41, communicates with the flow path, and communicates with the intake line at the front end of the throttle valve 25 through the intake bypass line 12. The second passageway 43 is formed in the housing 41, communicates with the flow path and communicates with the intake line 10 at the front end of the throttle valve 25.

The drive unit is a power source which is installed in the housing 41 and operates a blocking portion. The drive unit may be configured by, or include, a solenoid valve that includes a coil 45 which generates magnetic forces based on whether electric power is supplied, a flange 46 which selectively closes the first passageway 42 as a function of the magnetic forces generated by the coil 45 and a spring 47 which provides elastic force in a direction in which the flange 46 closes the first passageway 42.

That is, when no electric power is applied to the coil 45, the flange 46 closes the first passageway 42 by being moved downward by elastic force of the spring 47. On the contrary, when electric power is applied to the coil 45, the flange 46 opens the first passageway 42 by being moved upward, such that the first passageway 42 and the second passageway 43 communicate with each other.

In a case in which the residual exhaust gas remains in the intake line 10 between the rear end of the compressor 72 and the front end of the throttle valve 25, the controller 90 opens the recirculation valve 40 so as to additionally supply the intake gas into the combustion chamber 21.

For example, in a case in which the engine is turned off during a process in which the recirculation gas is supplied into the combustion chamber 21 through the EGR system 50, the exhaust gas remains in the intake line 10 between the compressor 72 and the combustion chamber 21. Further, when the engine 20 is turned on again, the residual exhaust gas remaining in the intake line 10 is supplied into the combustion chamber 21. As a result, abnormal combustion such as knocking or pre-ignition may occur due to the residual exhaust gas.

To prevent the aforementioned abnormal combustion, the controller 90 calculates the amount of residual exhaust gas after the engine 20 is turned off, and if the amount of residual exhaust gas is larger than a preset amount, the controller 90 opens the recirculation valve 40 when the engine 20 is turned on again. In this case, the controller 90 may calculate the amount of residual exhaust gas based on the EGR ratio and a volume of the intake line, although other factors may also be considered.

Figure 2:
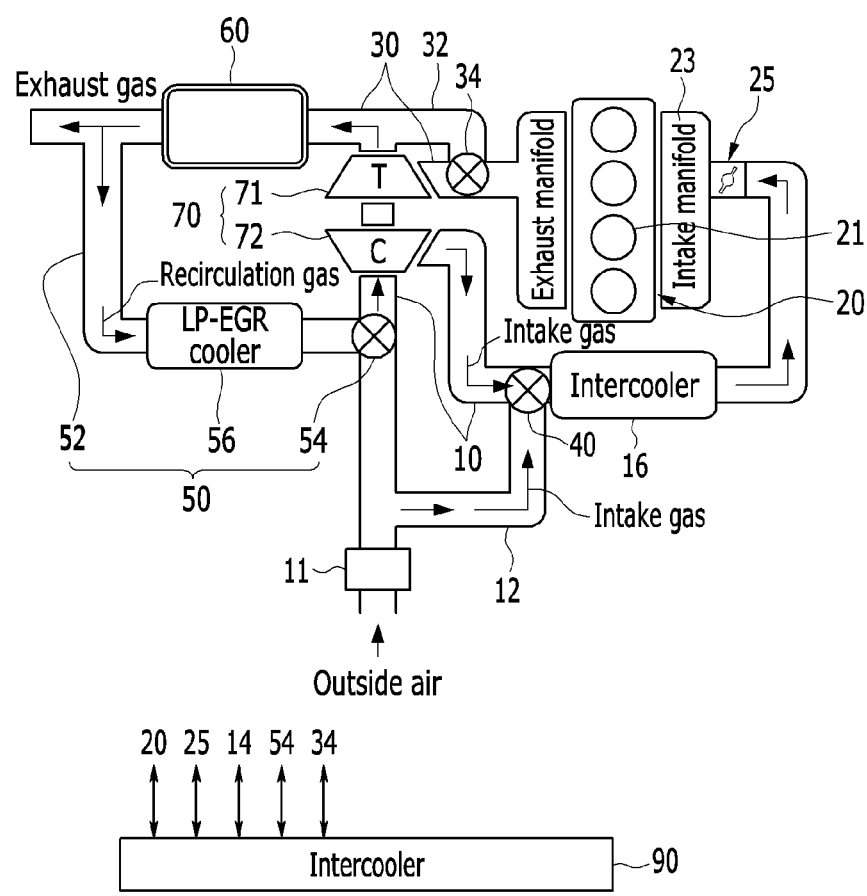
FIGS. 2 and 3 are conceptual views illustrating a flow of intake gas which passes through a recirculation valve in an engine system according to exemplary embodiments of the present disclosure.
Figure 3:
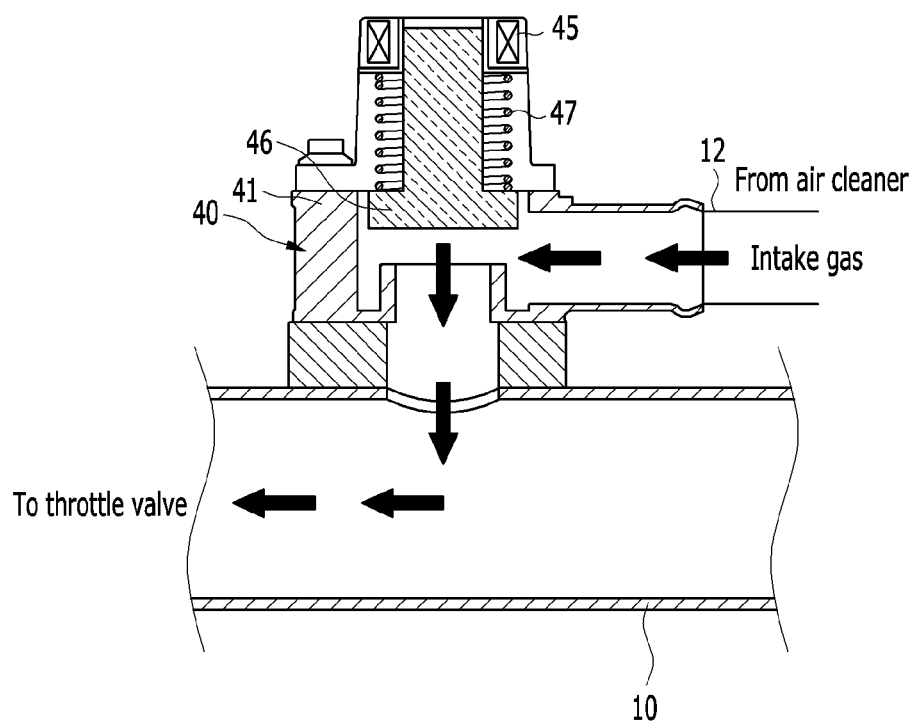

As illustrated in FIGS. 2 and 3, when the recirculation valve 40 is opened when the engine 20 is turned on again, the intake gas to be supplied into the combustion chamber 21 is supplied into the combustion chamber 21 through a first intake path (the air cleaner 11->the compressor 72->the intercooler 16->the throttle valve 25) formed by the intake line 10 and a second intake path (the air cleaner 11->the recirculation valve 40->the intercooler 16->the throttle valve 25) formed by the intake line 10 and the intake bypass line 12. Therefore, the amount of intake gas to be supplied into the combustion chamber 21 is increased, and as a result, it is possible to reduce the concentration of the residual exhaust gas included in the intake gas to be supplied into the combustion chamber 21 and to prevent the occurrence of abnormal combustion.

The intake gas to be supplied into the combustion chamber 21 is generally supplied through the first intake path, and if the amount of residual exhaust gas is larger than a preset amount, the recirculation valve 40 is opened, and the amount of intake gas to be supplied into the combustion chamber 21 through the second intake path is increased. As a result, the concentration of the residual exhaust gas may be decreased.

Meanwhile, the recirculation valve 40 may selectively discharge high pressure, which is formed between the rear end of the compressor 72 and the front end of the throttle valve 25, to the intake line 10 at the front end of the compressor 72.

For example, in a case in which a driver performs a tip-out operation while the vehicle accelerates, the controller 90 closes the throttle valve 25 so as to block the supply of the intake gas into the combustion chamber 21 in order to reduce output of the engine 20. In this case, boost pressure is formed in the intake line 10 between the rear end of the compressor 72 and the throttle valve 25 by the turbocharger 70.

Figure 4:
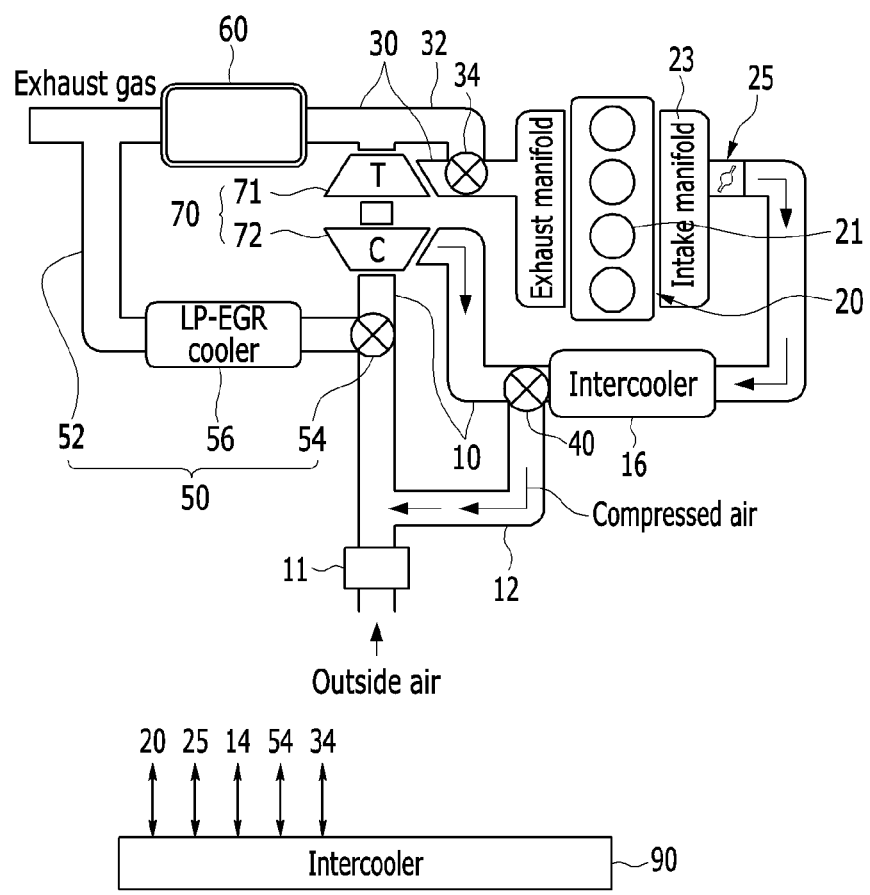
FIGS. 4 and 5 are conceptual views illustrating a flow of compressed air which passes through a recirculation valve in an engine system according to exemplary embodiments of the present disclosure.
Figure 5:
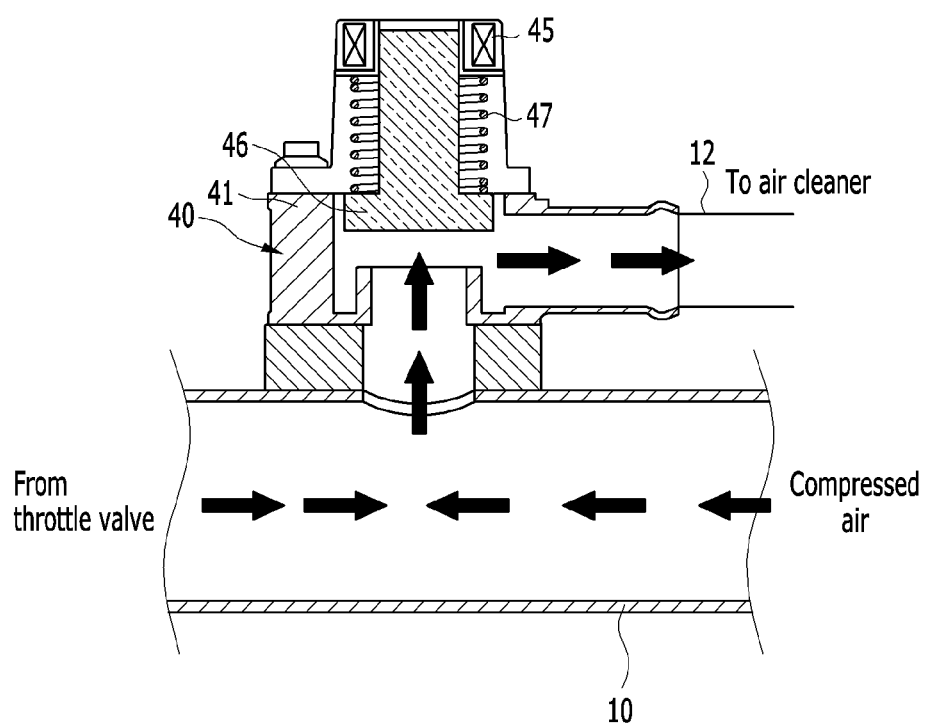

Therefore, as illustrated in FIGS. 4 and 5, the controller 90 controls and opens the recirculation valve 40 so as to discharge the boost pressure, which is formed in the intake line 10 between the rear end of the compressor 72 and the throttle valve 25, to the intake line 10 at the front end of the compressor 72 through the intake bypass line 12.

If the boost pressure remains in the intake line 10 between the rear end of the compressor 72 and the throttle valve 25, a surging impact may occur when the throttle valve 25 is opened again. Therefore, the controller 90 opens the recirculation valve 40 and discharges the boost pressure in the intake line 10 through the intake bypass line 12.

Hereinafter, a method of controlling an engine system according to exemplary embodiments of the present disclosure will be described in detail with reference to the accompanying drawings.

Figure 6:
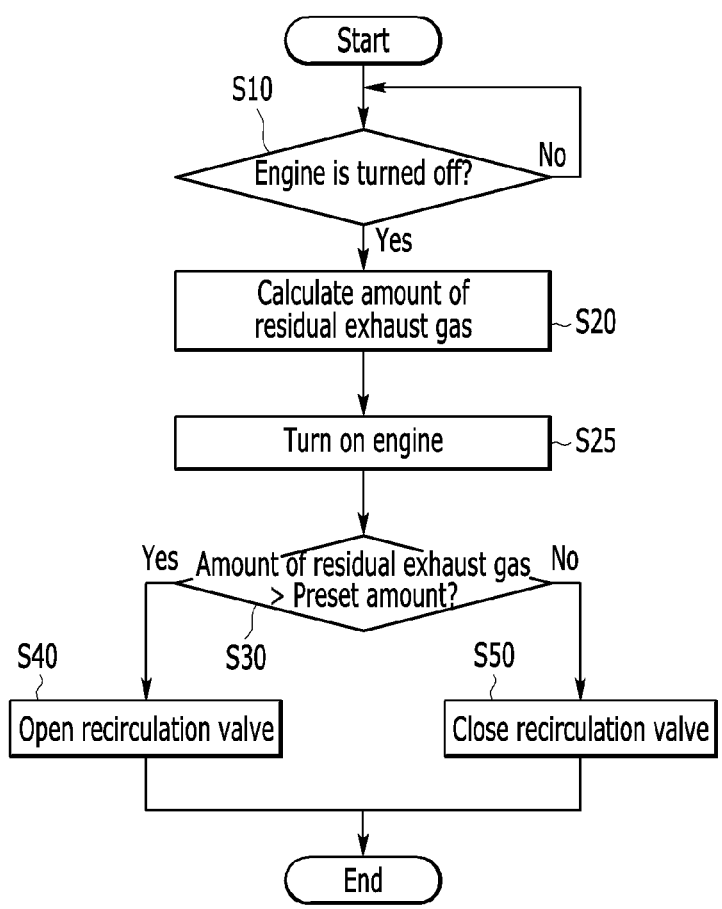
FIG. 6 is a flowchart illustrating a method of controlling an engine according to exemplary embodiments of the present disclosure.

FIG. 6 is a flowchart illustrating a method of controlling an engine according to exemplary embodiments of the present disclosure.

As illustrated in FIG. 6, the controller 90 determines whether the engine 20 is turned off (S10).

When the engine 20 is turned off, the controller 90 calculates the amount of residual exhaust gas remaining in the intake line 10 between the compressor 72 and the intake manifold 23 (S20). In this case, the controller 90 may calculate the amount of residual exhaust gas based on the EGR ratio (exhaust gas recirculation ratio) and a volume of the intake line 10.

The EGR ratio means the amount of recirculation gas that is supplied into the combustion chamber 21 through the EGR system 50 before the engine 20 is turned off, and the volume of the intake line 10 is determined in advance by design or experimentation. As a result, the amount of residual exhaust gas may be calculated based on the EGR ratio and the volume of the intake line 10.

When the engine 20 is turned on again at step S25, the controller 90 compares the amount of residual exhaust gas with a preset amount (S30), and if the amount of residual exhaust gas is larger than the preset amount, the controller 90 opens the recirculation valve 40 (S40) and allows the intake gas, which is to be supplied into the combustion chamber 21, to be supplied through the first intake path and the second intake path.

If the amount of residual exhaust gas is equal to or less than the preset amount in step S30, the controller 90 closes the recirculation valve 40 (S50), and allows the intake gas, which is to be supplied into the combustion chamber 21, to be supplied through only the first intake path.

Accordingly, the concentration of the residual gas to be introduced into the combustion chamber 21 of the engine is minimized. As a result, the occurrence of abnormal combustion such as knocking or pre-ignition in the combustion chamber is reduced or prevented.

As described above, according to the engine system and the control method according to exemplary embodiments of the present disclosure, the recirculation valve 40 is selectively opened in accordance with the amount of the residual exhaust gas remaining in the intake line 10, and as a result, it is possible to reduce the concentration of the residual exhaust gas included in the intake gas to be supplied into the combustion chamber 21 and thus to prevent the occurrence of abnormal combustion.

While this disclosure has been described in connection with what is presently considered to be exemplary embodiments, it is to be understood that the disclosure is not limited to the disclosed embodiments, but, on the contrary, is intended to cover various modifications and equivalent arrangements included within the spirit and scope of the appended claims.

What is claimed is:

1. An engine system, comprising:
    an intake line through which fresh air to be supplied into a combustion chamber of an engine flows;
    an exhaust line through which exhaust gas discharged from the combustion chamber flows;
    an exhaust gas recirculation (EGR) system which recirculates a part of exhaust gas discharged from the combustion chamber to the combustion chamber;
    a turbocharger including a turbine provided in the exhaust line and rotated by exhaust gas discharged from the combustion chamber, and a compressor provided in the intake line and rotated in conjunction with the rotation of the turbine, wherein the compressor compresses outside air;
    an intake bypass line which branches off from the intake line at a rear end of the compressor and merges into the intake line at a front end of the compressor;
    a recirculation valve installed at a point at which the intake bypass line and the intake line merge together; and
    a controller which controls operations of opening and closing the recirculation valve so that a portion of the intake gas compressed by the compressor is supplied into the intake line at the front end of the compressor through the intake bypass line, or the intake gas is supplied into the combustion chamber through the intake bypass line,
    wherein the controller controls and opens the recirculation valve at a time of tip-out, such that the portion of the intake gas compressed by the compressor is supplied into the intake line at the front end of the compressor, and
    wherein when the engine is turned back on after turning off the engine during supply of the recirculation gas into the combustion chamber through the EGR system, the controller controls and opens the recirculation valve to supply the intake gas into the combustion chamber through a first intake path, which comprises an air filter, the compressor, the intercooler, and a throttle valve, through the intake line, and a second intake path, which comprises the air filter, the recirculation valve, the intercooler, and the throttle valve, through the intake line and the intake bypass line.

2. The engine system of claim 1, wherein the controller calculates the amount of residual exhaust gas remaining in the intake line between the compressor and the combustion chamber after the engine is turned off, and when the amount of residual exhaust gas is larger than a preset amount, the controller controls and opens the recirculation valve when the engine is turned on again.

3. The engine system of claim 2, wherein the controller calculates the amount of residual exhaust gas remaining in the intake line between the compressor and the combustion chamber based on an EGR ratio and a volume of the intake line.

4. The engine system of claim 1, wherein the recirculation valve is disposed at an inlet or an outlet of an intercooler disposed in the intake line at the rear end of the compressor.

5. A method of controlling an engine, the method comprising:
    calculating, by a controller, an amount of residual exhaust gas remaining in an intake line between a compressor of a turbocharger and an intake manifold after an engine is turned off; and
    controlling, by the controller, based on the calculated amount of the residual exhaust gas remaining in the intake line between the compressor and the intake manifold, operations of opening and closing a recirculation valve installed in an intake bypass line which branches off from the intake line at a front end of a combustion chamber and merges into the intake line at a front end of the compressor of the turbocharger,
    wherein the controller controls and opens the recirculation valve at a time of tip-out, such that a portion of the intake gas compressed by the compressor is supplied into the intake line at the front end of the compressor, and
    wherein when the engine is turned back on after turning off the engine during supply of the recirculation gas into the combustion chamber through the EGR system, the controller controls and opens the recirculation valve to supply the intake gas into the combustion chamber through a first intake path, which comprises an air filter, the compressor, the intercooler, and a throttle valve, through the intake line, and a second intake path, which comprises the air filter, the recirculation valve, the intercooler, and the throttle valve, through the intake line and the intake bypass line.

6. The method of claim 5, wherein the controlling includes:
   determining, by the controller, whether the amount of residual exhaust gas is larger than a preset amount; and
   opening, by the controller, the recirculation valve when the engine is turned on again, when the amount of residual exhaust gas is larger than the preset amount.

7. The method of claim 5, wherein the amount of residual exhaust gas is calculated based on an EGR ratio and a volume of the intake line.

* * * * *